(12) United States Patent
Eleftheriadis et al.

(10) Patent No.: US 12,614,908 B2
(45) Date of Patent: Apr. 28, 2026

(54) FREQUENCY BALANCING BY POWER SUPPLY UNITS

(71) Applicant: Telefonaktiebolaget LM Ericsson (publ), Stockholm (SE)

(72) Inventors: Lackis Eleftheriadis, Valbo (SE); Yifei Jin, Solna (SE); Rafia Inam, Västerås (SE); Aneta Vulgarakis Feljan, Stockholm (SE); Athanasios Karapantelakis, Solna (SE); Maxim Teslenko, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 920 days.

(21) Appl. No.: 17/772,404

(22) PCT Filed: Oct. 30, 2019

(86) PCT No.: PCT/SE2019/051084
§ 371 (c)(1),
(2) Date: Apr. 27, 2022

(87) PCT Pub. No.: WO2021/086240
PCT Pub. Date: May 6, 2021

(65) Prior Publication Data
US 2022/0376503 A1     Nov. 24, 2022

(51) Int. Cl.
*H02J 3/14* (2006.01)
*H02J 3/32* (2006.01)
(Continued)

(52) U.S. Cl.
CPC   *H02J 3/14* (2013.01); *H02J 3/32* (2013.01); *H02J 13/12* (2026.01)

(58) Field of Classification Search
CPC .......... H02J 3/14; H02J 3/32; H02J 13/00002; H02J 3/18; H02M 1/007; H02M 1/42;
(Continued)

(56) References Cited

U.S. PATENT DOCUMENTS 10,754,317 B2 *  8/2020  Wilson ................. G05B 19/042
2013/0321040 A1   12/2013  Johal et al.
(Continued)

FOREIGN PATENT DOCUMENTS

| CN | 102694381 A | 9/2012 |
| CN | 104349006 A | 2/2015 |

(Continued)

OTHER PUBLICATIONS

EPO Communication with Supplementary European Search Report dated Nov. 8, 2023 for Patent Application No. 19950841.7, consisting of 8 pages.
(Continued)

*Primary Examiner* — Mohammad Ali
*Assistant Examiner* — Dhruvkumar Patel
(74) *Attorney, Agent, or Firm* — Weisberg I.P. Law, P.A.

(57)         ABSTRACT
A method for providing frequency balancing in a power network grid by an RBS of a radio communication network. The RBS includes one or more power supply units, PSUs, connected to the power network grid. The method includes detecting a deviation of a power network grid frequency measured in a PSU of the one or more PSUs, the power network grid frequency is measured upstream of a power factor correction, PFC, unit of the PSU, deactivating the one or more PSU in response to the detected deviation, determining one or more further PSU to be deactivated based on the detected deviation, the RBS is in a first frequency containment reserve, FCR, zone and the one or more further PSU are in a second FCR zone, other than the first FCR
(Continued)

Power ————
Signal ------------- zone, and sending a deactivation indication to the determined one or more further PSU.

20 Claims, 7 Drawing Sheets

(51) Int. Cl.
   *H02J 13/00* (2006.01)
   *H02J 13/12* (2026.01)

(58) Field of Classification Search
   CPC .... Y02B 70/10; Y02B 70/3225; Y02B 90/20;
   Y04S 10/30; Y04S 20/12; Y04S 20/222
   See application file for complete search history.

(56) References Cited

U.S. PATENT DOCUMENTS

| | | | |
|---|---|---|---|
| 2014/0114487 A1 | 4/2014 | Hazra et al. | |
| 2014/0163759 A1* | 6/2014 | Anderson | G06Q 50/06 |
| | | | 700/291 |
| 2014/0200722 A1 | 7/2014 | Bhavaraju | |
| 2017/0012668 A1 | 1/2017 | Fang | |
| 2017/0098937 A1* | 4/2017 | Huomo | H02J 3/14 |
| 2017/0179720 A1* | 6/2017 | Porter | H02J 3/16 |
| 2018/0302804 A1* | 10/2018 | Eleftheriadis | H02J 9/06 |
| 2019/0027933 A1* | 1/2019 | Lian | H02J 3/12 |
| 2019/0252882 A1* | 8/2019 | Li | H02J 3/14 |
| 2020/0373758 A1* | 11/2020 | Cox | H02J 3/241 |
| 2022/0190599 A1* | 6/2022 | Claessens | H02J 3/144 |

FOREIGN PATENT DOCUMENTS

| | | | |
|---|---|---|---|
| CN | 106463961 A | 2/2017 | |
| CN | 110198031 A | 9/2019 | |
| EP | 3289651 B1 | 3/2018 | |
| WO | WO-2019086121 A1 * | 5/2019 | ........ H02J 13/00002 |

OTHER PUBLICATIONS

International Search Report and Written Opinion dated Oct. 5, 2020 for International Application No. PCT/SE2019/051084 filed Oct. 30, 2019; consisting of 13 pages.

Chinese Office Action and English Summary dated Apr. 9, 2025 for Application No. 201980103378.5, consisting of 9 pages.

Zhu et al. "Energy storage coordination among various energy networks in Energy Internet;" Advanced Technology of Electrical Engineering and Energy; vol. 37, No. 3, Mar. 2018, consisting of 7 pages.

Chinese Office Action and English summary dated Dec. 31, 2025 for Application No. 201980103378.5, consisting of 11 pages.

* cited by examiner

FREQUENCY BALANCING BY POWER SUPPLY UNITS

CROSS-REFERENCE TO RELATED APPLICATIONS

This application is a Submission Under 35 U.S.C. § 371 for U.S. National Stage Patent Application of International Application Number: PCT/SE2019/051084, filed Oct. 30, 2019 entitled "FREQUENCY BALANCING BY POWER SUPPLY UNITS IN RADIO BASE STATION," the entirety of which is incorporated herein by reference.

TECHNICAL FIELD

The present disclosure relates to methods, a radio base stations, PSUs, computer program products, and computer programs for frequency balancing in a power network grid.

BACKGROUND

Alternating current (AC) power grid and power transmission experience frequency variations on transmission lines, which is based on different consumer loads connected to the power grid.

The state grid in countries generally apply a method called Frequency Containment Reserve (FCR) for stabilizing the frequency of the power grid to around 50 Hz or 60 Hz. If the frequency is not sufficiently stabilized the total power generation in the transmission lines will collapse and a power outage will occur.

A country is generally divided into different electric grid regions, e.g. four regions called S1 to S4 (country dependent), and there are different generation units producing power in the grid regions. There are also generally generation units specifically for supporting the power grid for normal operation (FCR-N) and for supporting disturbance situations (FCR-D).

The generation units for supporting FCR-N and FCR-D are not effective and has problems meeting latency requirements to support fast control towards 100 mHz frequency changes.

SUMMARY

One objective is to enable reduced latency of signalling in frequency balancing in a power network grid.

According to a first aspect there is presented a method for providing frequency balancing in a power network grid. The method is performed in a radio base station (RBS) of a radio communication network. The RBS comprises one or more power supply units (PSUs) connected to the power network grid. The method comprises detecting a deviation of a power network grid frequency measured in a PSU of the one or more PSUs, wherein the power network grid frequency is measured upstream of a power factor correction, PFC, unit of the PSU, deactivating the one or more PSU in response to the detected deviation, to stop the RBS from drawing power from the power network grid, determining one or more further PSU to be deactivated based on the detected deviation, wherein the RBS is in a first frequency containment reserve, FCR, zone and the one or more further PSU are in a second FCR zone, other than the first FCR zone, and sending a deactivation indication to the determined one or more further PSU. No new power generator is needed to be built for frequency balancing in the power network grid, by using already existing RBSs. Low latency PSU control is enabled by upstream measurement of the PFC. Multiple chain FCR control activations based on FCR areas around the RBS is also enabled by the presented method.

The method may further comprise configuring the RBS with a service layer agreement, SLA, for supervisory control and data acquisition, SCADA, signalling. Low latency signalling is in this way enabled by using e.g. a radio scheduler to use the higher bandwidths and higher frequencies in signalling between SCADA, RAN and RBS The method may further comprise negotiating FCR control for the RBS with SCADA for the power network grid. The method enables scaling of different RBSs and RAN with FCR mechanics for power grid support and SCADA interaction.

The one or more further PSUs may be determined based on grid frequencies measured in the one or more further PSUs. By using information from e.g. RAN network on different RBS via S1, information can be highlighted to better control and implement FCR adjustments.

The method may further comprise detecting a return to a normal grid frequency of the power network grid frequency measured in the PSU, wherein the power network grid frequency is measured upstream of a PFC unit of the PSU, and determining which of the deactivated PSUs to activate when, based on grid frequencies measured in the deactivated PSUs.

The determination to activate may comprise a condition whether to charge a backup battery or not.

The deactivation indication may be sent via the X2 interface. By using already existing interface as X2, signalling is more effective compared to other existing solutions.

The detecting and the deactivating steps may be performed in the PSU. The deactivation may be performed within 200 ms of the detection when the frequency deviation is measured to be at least 0.06 Hz/s.

The RBS may be powered by a three-phase power via one or more PSU per phase.

The RBS may comprise a battery backup configured to supply the RBS with power when the one or more PSUs are deactivated.

The method may further comprise predicting future FCR activations for RBSs and/or datacentre infrastructure by machine learning, and initiate chain control for FCR zoning and FCR activations via S1 and X2 interface.

According to a second aspect there is presented a method for providing frequency balancing in a power network grid. The method is performed in a PSU connected to the power network grid. The method comprises detecting a deviation of a power network grid frequency measured in the PSU, wherein the power network grid frequency is measured upstream of a PFC unit of the PSU, deactivating the PSU in response to the detected deviation, to stop the PSU from drawing power from the power network grid, determining one or more further PSU to be deactivated based on the detected deviation, wherein the PSU is in a first FCR zone and the one or more further PSU are in a second FCR zone, other than the first FCR zone, and sending a deactivation indication to the determined one or more further PSU.

The method may further comprise configuring the PSU with an SLA for SCADA signalling.

The method may further comprise negotiating FCR control for the PSU with SCADA for the power network grid.

The one or more further PSUs may be determined based on grid frequencies measured in the one or more further PSUs.

The method may further comprise detecting a return to a normal grid frequency of the power network grid frequency measured in the PSU, wherein the power network grid frequency is measured upstream of a PFC unit of the PSU, and determining which of the deactivated PSUs to activate when, based on grid frequencies measured in the deactivated PSUs. The determination to activate may comprise a condition whether to charge a backup battery or not.

The deactivation may be performed within 200 ms of the detection when the frequency deviation is measured to be at least 0.06 Hz/s.

The method may further comprise predicting future FCR activations for RBSs and/or datacentre infrastructure by machine learning, and initiate chain control for FCR zoning and FCR activations via S1 and X2 interface.

According to a third aspect there is presented an RBS for frequency balancing in a power network grid. The RBS comprises one or more PSUs connected to the power network grid. The one or more PSUs comprises a processing circuitry and a computer program product storing instructions that, when executed by the processing circuitry, causes the one or more PSUs to detect a deviation of a power network grid frequency measured in a PSU of the one or more PSUs, wherein the power network grid frequency is measured upstream of a PFC unit of the PSU, deactivate the one or more PSU in response to the detected deviation, to stop the RBS from drawing power from the power network grid, determine one or more further PSU to be deactivated based on the detected deviation, wherein the RBS is in a first FCR zone and the one or more further PSU are in a second FCR zone, other than the first FCR zone, and send a deactivation indication to the determined one or more further PSU.

According to a fourth aspect there is presented a PSU for frequency balancing in a power network grid. The PSU is connected to the power network grid. The PSU comprises a processing circuitry and a computer program product storing instructions that, when executed by the processing circuitry, causes the PSU to detect a deviation of a power network grid frequency measured in the PSU, wherein the power network grid frequency is measured upstream of a PFC unit of the PSU, deactivate the PSU in response to the detected deviation, to stop the PSU from drawing power from the power network grid, determine one or more further PSU to be deactivated based on the detected deviation, wherein the PSU is in a first FCR zone and the one or more further PSU are in a second FCR zone, other than the first FCR zone, and send a deactivation indication to the determined one or more further PSU.

According to a fifth aspect there is presented a computer program for frequency balancing in a power network grid. The computer program comprises computer program code which, when run in a radio base station, RBS, comprising one or more PSUs connected to the power network grid, causes the one or more PSUs to detect a deviation of a power network grid frequency measured in a PSU of the one or more PSUs, wherein the power network grid frequency is measured upstream of a PFC unit of the PSU, deactivate the one or more PSU in response to the detected deviation, to stop the RBS from drawing power from the power network grid, determine one or more further PSU to be deactivated based on the detected deviation, wherein the RBS is in a first FCR zone and the one or more further PSU are in a second FCR zone, other than the first FCR zone, and send a deactivation indication to the determined one or more further PSU.

According to a sixth aspect there is presented a computer program for frequency balancing in a power network grid. The computer program comprises computer program code which, when run in a PSU connected to the power network grid, causes the PSU to detect a deviation of a power network grid frequency measured in the PSU, wherein the power network grid frequency is measured upstream of a PFC unit of the PSU, deactivate the PSU in response to the detected deviation, to stop the PSU from drawing power from the power network grid, determine one or more further PSU to be deactivated based on the detected deviation, wherein the PSU is in a first FCR zone and the one or more further PSU are in a second FCR zone, other than the first FCR zone, and send a deactivation indication to the determined one or more further PSU.

A computer program product comprising a computer program and a computer readable storage means on which the computer program is stored is also presented.

By the use of power network grid frequency measurements upstream of a PFC unit in a PSU (or other frequency measure processor), the latency in deactivating power drawn from the power network grid is achieved.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

Figures 1, 2:
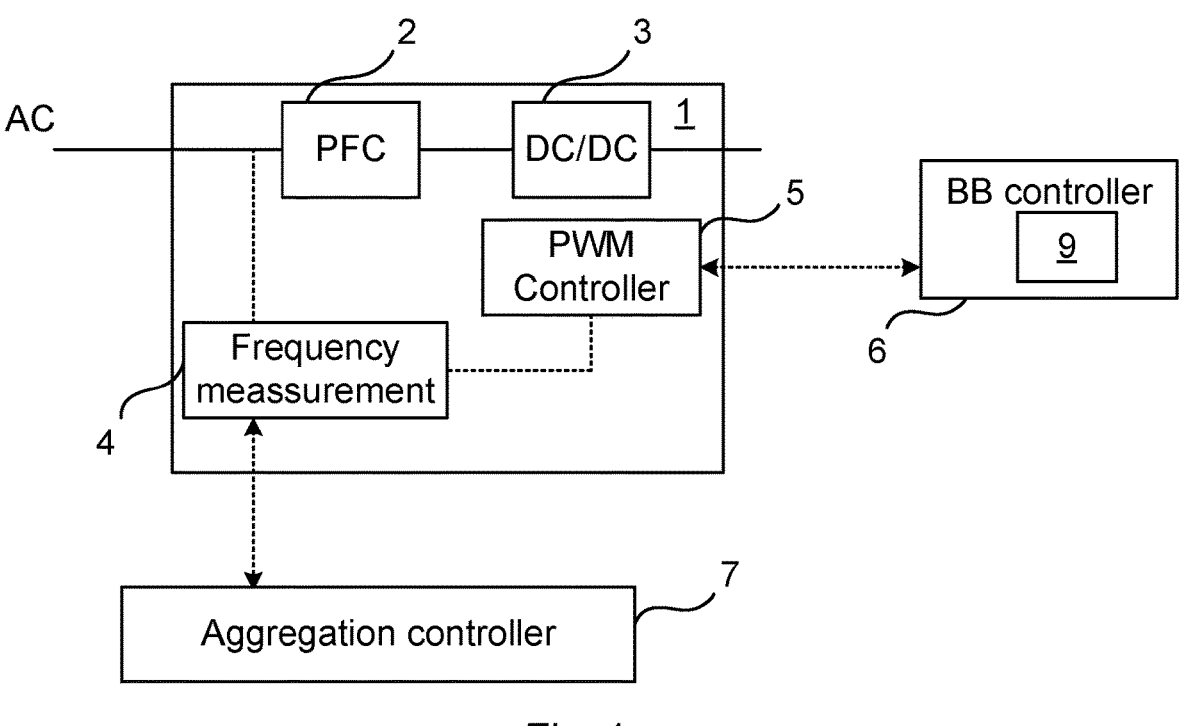
FIG. 1 is a diagram schematically illustrating of a PSU according to an embodiment presented herein.
FIG. 2 is a diagram schematically illustrating scheduler allocation between FCR areas according to an embodiment presented herein.

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

A solution is presented herein, enabling use of radio base stations (RBSs) to provide frequency balancing in a power network grid with low latency in signalling. Since RBSs generally have battery backup facilities, the can advantageously be utilized to support the power network grid they are connected to. Further, the RBSs are spread geographically and can advantageously be used for active support for frequency containment reserve (FCR) based on different locations.

FCR units are today generally a variety of different power generators (or other generation equipment) configured to add or/and remove energy from the power network grid, to increases or decreases the frequency in the power network grid.

Power units need to comply to some requirements to be able to support FCR in e.g. Sweden. A minimum power activation is 0.1 MW. Normal FCR (FCR-N) regulation is in the range of 49.9-50.1 Hz, i.e. within 0.1 Hz of 50 Hz. Disturbance FCR (FCR-D) upwards regulation is in the range of 49.9-49.5 Hz. FCR-D downwards regulation is in the range of 50.1-50.5 Hz. Different energy reserves shall be activated every second if the energy of 0.1 MW is not enough for supporting FCR. Different FCR zones can be activated.

There exist a large number of RBSs from different operators in Sweden, and each RBS can typically only provide parts of the minimum power FCR activation. The situation is generally applicable to other countries, and Sweden is herein only used as an example. This can be solved by connecting a number of RBSs in an FCR area in order to fulfil the minimum power FCR activation. A challenging part in supporting FCR with a number of RBSs is related to latency requirements on reacting and enabling fast response of an FCR activation signal. Signalling between different equipment of different operators is a critical aspect and need improvement.

Another factor impacting the frequency stabilization is the increased power generation from renewable energy sources, which makes the generation unpredictable, and requires control with low latency, so as not to overcompensate the grid.

An example of today's current system is for activation signals and delays that reaches 7-10 seconds, round trip time. The reaction time is a problem of today's equipment, which incorporates latency delay for frequency measurement, platform, network delay, and power supply unit (PSU).

On average 50% reduction in input current (and power) can be reached in between 3-5 s from sending the activation command. Rectifiers are in a test quick to start reacting, about one second, but take over two seconds for the output voltage to decline enough to allow more than 50% of the load.

RBSs can be enabled to be an active part of the grid support system, by implementing an aggregation point from a power network control system (also known as supervisory control and data acquisition (SCADA)) to RBS, to activate or deactivate the RBS energy demand. By deactivating several RBS's power need at the same time, the grid generation and transmission lines support does not need to be increased and thereby support and enable FCR control.

Reaction time and low latency requirement is one of the most critical issues to overcome for FCR control, and this can be mitigated by the usage of new 5G technologies.

Figures 3, 4:
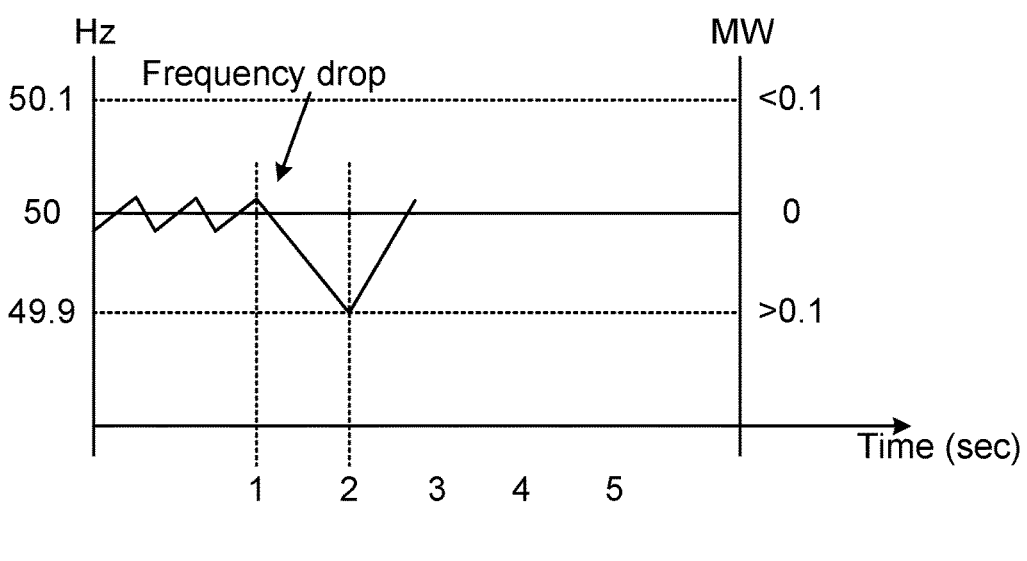
FIG. 3 is a diagram schematically illustrating frequency balancing in a power network grid.
FIG. 4 is a diagram schematically illustrating FCR area adaptation according to an embodiment presented herein.

Reaction time and latency effects are illustrated in FIG. 3. The grid frequency of a power network grid initially varies close to desired 50 Hz. At the time 1 s the grid frequency drops 0.1 Hz over one second, which deviation is still within FCR-N handling. As illustrated in FIG. 3 the FCR-N handling in this case manage to get the grid frequency back close to 50 Hz. However, in case the grid frequency at the time 2 s would continue below 49.9 Hz, FCR-D upward regulation would instead be applied until the grid frequency would be back to normal handling.

Particularly 5G RBSs are suitable for FCR network and control, but also other PSU units may be used in a similar way. Today there is a large install base of RBSs in Sweden. RBSs and also data centre infrastructures, consume a lot of power, and generally have backup battery facilities. In Sweden there exist more than 47 000 RBSs, which may have an available amount of power for FCR control of up to about 188 MW (depending on number of base stations).

An RBS location can be used as virtual FCR generator/reserve when it complies to the FCR requirements. An RBS radio can be used for signalling to other FCR generators or control of power substations via radio access network (RAN) basically because the lower latency in signalling.

By activating a radio scheduler, e.g. within and based on a service layer agreement (SLA), to use the higher bandwidths and higher frequencies of the radio scheduler, the latency in signalling from SCADA—RAN—RBS can significantly be reduced via e.g. S1 signalling and enable PSU control to adjust in the 100 mHz area that is required in FCR-N.

By a dedicated initial measurement and reaction control inside a PSU (for one or more RBSs) reaction time can be significantly reduced for FCR usage.

Control communication via radio scheduler allocation may be used to lower the latency and response by using the X2 interface to apply FCR control on a nearby site in the RAN network.

By aligning different RBSs in the RAN network, the reaction times and frequencies may be synchronized, and based on the radio scheduler allocation the changes on frequency lowers the latency to control.

Figures 5A, 5B:
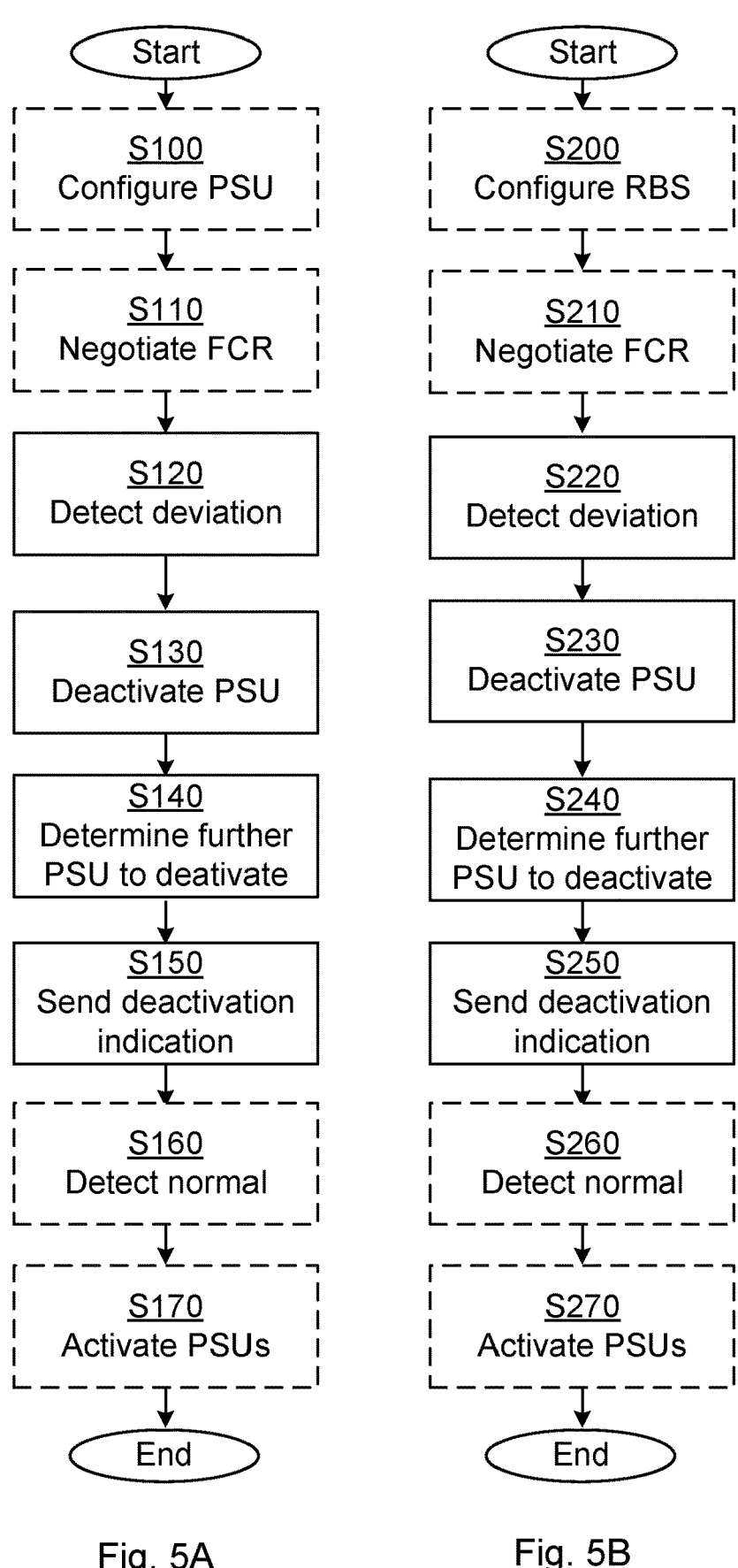
FIGS. 5A and 5B are flow charts schematically illustrating embodiments of methods presented herein.

According to an aspect, an embodiment of a method for providing frequency balancing in a power network grid is presented with reference to FIG. 5A. The method is performed in an PSU 1 connected to the power network grid. In processing block S120 a deviation of a power network grid frequency measured in the PSU 1 is detected. The power network grid frequency is measured upstream of a power factor correction (PFC) unit 2 (or other frequency processing unit) of the PSU 1. In processing block S130 the PSU 1 is deactivated in response to the detected deviation, to stop the PSU 1 from drawing power from the power network grid. In processing block S140 one or more further PSU 1 is determined to be deactivated based on the detected deviation. The PSU 1 is in a first FCR zone and the one or more further PSU 1 are in a second FCR zone, other than the first FCR zone. In processing block S150 a deactivation indication is sent to the determined one or more further PSU 1.

The method may further comprise optional processing block S100, wherein the PSU is configured with an SLA for SCADA signalling. In optional processing block S110 FCR control for the PSU is negotiated with SCADA for the power network grid.

The one or more further PSUs may be determined based on grid frequencies measured in the one or more further PSUs.

In optional processing block S160 a return to a normal grid frequency of the power network grid frequency measured in the PSU 1 is detected. The power network grid frequency is measured upstream of a PFC unit 2 of the PSU 1. In optional processing block S170 activation of the deactivated PSUs is determined. Which of the deactivated PSUs to activate and when to be active is based on grid frequencies measured in the deactivated PSUs.

Processing block S140 may comprise a condition whether to charge a backup battery or not.

Processing block S130 may be performed within 200 ms after processing block S120 when the frequency deviation is measured to be at least 0.06 Hz/s.

According to an aspect, an embodiment of a method for providing frequency balancing in a power network grid is presented with reference to FIG. 5B. The method is performed in an RBS of a radio communication network. The RBS comprises one or more PSUs connected to the power network grid. In processing block S220 a deviation of a power network grid frequency measured in a PSU 1 of the one or more PSUs is detected. The power network grid frequency is measured upstream of a power factor correction (PFC) unit 2 of the PSU. In processing block S230 the one or more PSU are deactivated in response to the detected deviation, to stop the RBS from drawing power from the power network grid. In processing block S240 one or more further PSU are determined to be deactivated based on the detected deviation. The RBS is in a first FCR zone and the one or more further PSU are in a second FCR zone, other than the first FCR zone. In processing block S250 a deactivation indication is sent to the determined one or more further PSU.

The method may further comprise optional processing block S200, wherein the RBS is configured with an SLA for SCADA signalling. In optional processing block S210 FCR control for the RBS is negotiated with SCADA for the power network grid.

The one or more further PSUs may be determined based on grid frequencies measured in the one or more further PSUs.

The method may further comprise optional processing block S260, wherein a return to a normal grid frequency is detected of the power network grid frequency measured in the PSU, wherein the power network grid frequency is measured upstream of a PFC unit 2 of the PSU. In optional processing block S270 activation of the deactivated PSUs is determined. Which PSU to activate and when to activate is based on grid frequencies measured in the deactivated PSUs.

The determination in processing block S270 may comprise a condition whether to charge a backup battery or not.

The deactivation indication in processing block S250 may be sent via the X2 interface.

Processing blocks S220, S230 and S260 may be performed in the PSU.

Processing block S230 may be performed within 200 ms after processing block S220 when the frequency deviation is measured to be at least 0.06 Hz/s.

The RBS may be powered by a three-phase power via one or more PSU per phase.

The RBS may comprise a battery backup configured to supply the RBS with power when the one or more PSUs are deactivated.

The operations shown in FIG. 5 will now be illustrated and described in more detail in conjunction with FIGS. 1-2, 4 and 6-10.

Methods presented herein enables the use of a PSU 1 to be an active part of the grid support system, by implementing an aggregation point for several PSUs 1 from SCADA 31 to PSU 1 (or other controlling part), to activate or deactivate the PSU energy demand. By deactivating several PSU's power need at the same time, the grid generation does not need to be increased and thereby supporting and enabling FCR control.

A PSU 1, or other controlling part 8, and an aggregation point 7 can inter-communicate with the SCADA system, when to be active or de-activate, and how much energy to be used/not used.

An aggregation point 7 may be controlled by a PSU 1 or an RBS 8, to provide a network of synchronized base stations for FCR control via an SLA. By turning of the PSU 1 on an RBS 8 (or in a data centre) used power can be released to various degrees depending on the demand from SCADA 31. When the PSUs 1 are turned off, the RBS 8 will instead be running on batteries, in partial state of charge (PSOC) mode operation between 80%-20% of the capacity of batteries, for a short time of period, e.g. minutes or hours depending on FCR signal.

An RBS 8 may further be provided with batteries divided in portions used for FCR control and other portions for backup of the RBS. The SLA may also be able to add only FCR control portion of the battery in the controller defining the energy portions, or also the battery backup portion in the controller defining the energy portions.

A PSU 1 for an RBS is schematically illustrated in FIG. 1. The PSU 1 comprises a PFC unit 2 connected to the power network grid and connected to the RBS via a DC/DC converter 3. The PSU 1 also comprises a pulse width modulation (PWM) controller 5, configured to control the DC/DC converter 3 and to communicate with a baseband (BB) controller 6 of the RBS. To improve reaction time for the PSU 1, the PSU 1 further comprises a frequency measurement unit 4 configured to measure the grid frequency upstream of the PFC unit 2, i.e. as close to the power network grid as possible. The frequency measurement unit 4 may also be configured to communicate with further PSUs, whereby synchronisation signals (to related PSU directly that improves low latency) or may be exchanged via an aggregation controller 7 point for synchronisation signalling to other PSUs. The aggregation controller 7 may be used to simultaneously deactivate all PSU within the same RBS. The PWM controller 5 can then be deactivated with minimal reaction time based on grid frequency measurements made by the frequency measurement unit 4 (that improve latency). Frequency changes of up to 100 mHz may then be controlled in less than one second. The PSU 1 can achieve this by measuring the frequency change and calculating the frequency derivate/slope in time and finally actuating the off control in the PWM controller 5. A slope measured by 0.06 Hz/s can activate off control within 200 ms, or delay/latency of 200 ms in frequency measure unit 4.

Based on e.g. SLA, the radio scheduler 9 in the BB controller 6 can select actively the physical resource blocks (PRBs) with higher frequency sub carriers (i.e. higher bandwidth) and higher spectrum (bands) to lower the latency in the radio networks towards other equipment and substations. The radio scheduler may further allocate only high frequency slots (sub carriers) and bands for signalling. Higher frequency sub carriers may for 5G e.g. b 28-50 GHz.

The X2 interface may in a RAN network be used to inter-communicate with other RBS to align or synchronise frequency adjustments (within the RAN), that synchronises RBSs and FCR zones for low latency.

By aligning different RBSs 8 in the RAN network, the reaction times and frequencies are synchronized that in advance enable radio scheduler allocations to adapt to the changes on frequency. This approach lowers the latency in an FCR zone.

Similarly, a backup battery of an RBS may be used to store power from the grid (within PSOC) to decease the grid frequency. A bi-directional PSU is needed to provide this functionality.

SLA from SCADA may be a simple set of parameters, such as area of coverage and power requirement. Capability exposure nodes, such as service capability exposure functions (SCEF), network exposure functions (NEF) in 5G, may pick up a request from SCADA, then communicate with home subscriber server (HSS) and mobility management entity (MME) nodes (unified data management (UDM) and access and mobility management function (AMF) in 5G) to correlate coverage with cell identities (IDs), and use S1 interface to activate frequency channel number (FCN) on these cell IDs that match coverage requirements of SCADA Radio scheduler allocations may be used for calculating the remaining power for the internal FCR control mechanism in further PSUs and also for radio scheduler allocation to lower latency (i.e. high subcarriers, high spectrum) for other equipment as generators or substation devices.

A first reaction and control activation can be performed via a PSU in the RBS, with 100 mHz in less than one second.

Based on power demand for FCR need from SCADA, the RAN network can initiate several FCR control signals towards RBSs based on generation of FCR area power maps vs further RBSs locations. Each RBS may decide and activate its PSUs, but then need to provide information up to the RAN with a certain timeframe in ms.

FIG. 2 illustrates communication between several RBSs 8 (8a, 8b, 8c, 8d) within a RAN 30 connected to SCADA 31. A first RBS 8a is illustrated with an evolved nodeB1 (eNB1) or a next-generation eNB1 (gNB1) base station in a first FCR area or zone FCR1. Second, third and fourth RBSs 8b-8d are also illustrated with corresponding eNB2/gNB2, eNB3/gNB3 and eNB4/gNB4 base station, each base station representing its own FCR area or zone FCR2, FCR3, and FCR4. Each RBS 8 is in radio communication with the RAN 30 via interface S1, and in radio communication with adjacent RBSs via interface X2. The RAN 30 is illustrated with an evolved packet core (EPC) or a 5G core network (5GC). The RAN 30 may have negotiated FCR conditions with SCADA 31 beforehand, e.g. the day before, agreed conditions apply. An agreement may e.g. be for a specific amount of power in one or more FCR zones during a specific period of time of the day.

To fulfil negotiated FCR conditions, the first RBS 8a can deactivate its PSUs, and send deactivation indications to further and adjacent RBS via the X2 interface or to further RAN base stations via the S1 interface, preferably indicating remaining power needed to be stopped and/or indicating amount of power stopped. Battery backup capacity depends on how much is installed in each respective RBS site and how much power each RBSs therein uses during a deactivated period of time. Also, the PSOC of battery operation may affect the battery backup capacity.

FIG. 4 illustrates that several RBSs may be aggregated for an FCR area or zone. In FCR1 four RBSs eNB1/gNB1, eNB2/gNB2, eNB3/gNB3 and eNB4/gNB4 are aggregated to a total of 1 MW, in FCR2 four other RBSs eNB5/gNB5, eNB6/gNB6, eNB7/gNB7 and eNB8/gNB8 are aggregated to 2 MW, and in FCR3 a single RBS eNB9/gNB9, with all of its PSUs, is aggregated to 0.5 MW. Each FCR area or zone may be configured as described in connection with FIG. 2. The RAN may furthermore divide RBS locations into an FCR area location. Mapping of RBSs to FCR zones may be performed by machine learning (ML). A chain of FCR deviations using RAN S1 and X2 interface may also be performed by ML, by selecting towards which areas to activate or not.

The most important requirement of FCR control is the latency/speed to activate the reserve in the RBS to the grid in a sufficiently short period of time. If the equipment has too much latency it cannot apply this functionality.

The ML may be performed for learning the FCR activation patterns and predict future FCR activations for RBSs and/or datacentre infrastructure and initiate chain control method for FCR zoning and FCR activations via S1 and X2 interface. Data processing can then be used to model and calculate in real time when an activation control signal is expected to be received from SCADA.

Input into the ML may comprise:

Initiation based on SLA for FCR control of RBS.

Input from SCADA to get a signal to start FCR, demanding a response.

Input power for demand response from SCADA, per 0.1 MW and total MW needed.

Input PSU can measure frequency deviation, from 50 Hz, in 100 mHz steps, wherein frequency derivate is measured.

Input nearby RBS can inform each other for activation via X2, via RAN.

Get available power for FCR control and RBS backup PSOC operation.

Get the information/signal via scheduler that has only high frequency subcarrier (high bandwidths in scheduler) or higher bands (higher spectrum) to lower the latency (SLA set the frequency allocations).

Output from the ML may then be:

Initiation of FCR control based on SLA.

Control of PSU, for 100 mHz steps, the first control internal of RBS.

Control of PSU above 100 mHz steps, the second control via SCADA.

RBS battery shall operate in PSOC, check between 80%-20% and ending signal for low battery capacity.

RAN: inform and activate nearby RBS via S1 or several RBSs via S1.

RAN network to map RBS in FCR areas and how much power to release in each area

RAN: initiate chain FCR control order of FCR zoning.

Signal to end FCR control to SCADA.

Energy of a backup battery may be stored during day time, from renewables, and may be used during night time. Energy may be stored during night time, based on low price during night time, to be used during day time.

Figure 6:
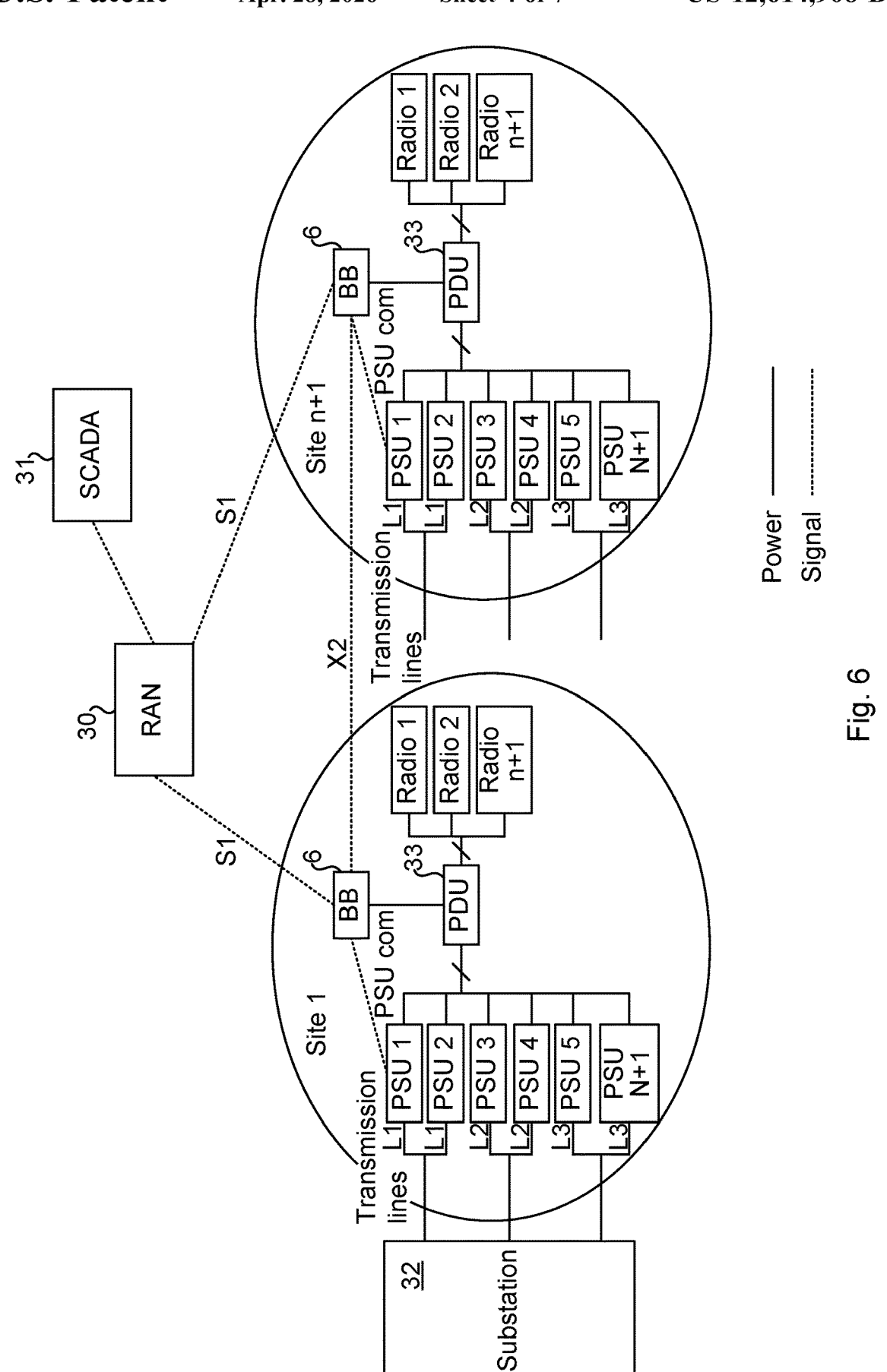
FIG. 6 is a diagram schematically illustrating FCR area adaptation according to an embodiment presented herein.

FIG. 6 describes how different PSUs may be connected within a site and within a RAN 30. A power network substation 32 is connected to a first site, site 1. The first site 1 is an RBS having a three-phase feeding with a first phase transmission line L1 feeding PSU1 and PSU2. A second phase transmission line L2 feeds PSU3 and PSU4, and a third phase transmission line L3 feeds PSU5 and PSUs N+1. Each PSU communicates with BB 6, and is connected to PDU 33. The PDU 33 is in turn connected to radio1, radio2 and radio n+1. The BB 6 communicates with RAN 30 via interface S1 and further similar sites n+1 via interface X2. The RAN 30 communicates with SCADA 31.

Figure 7:
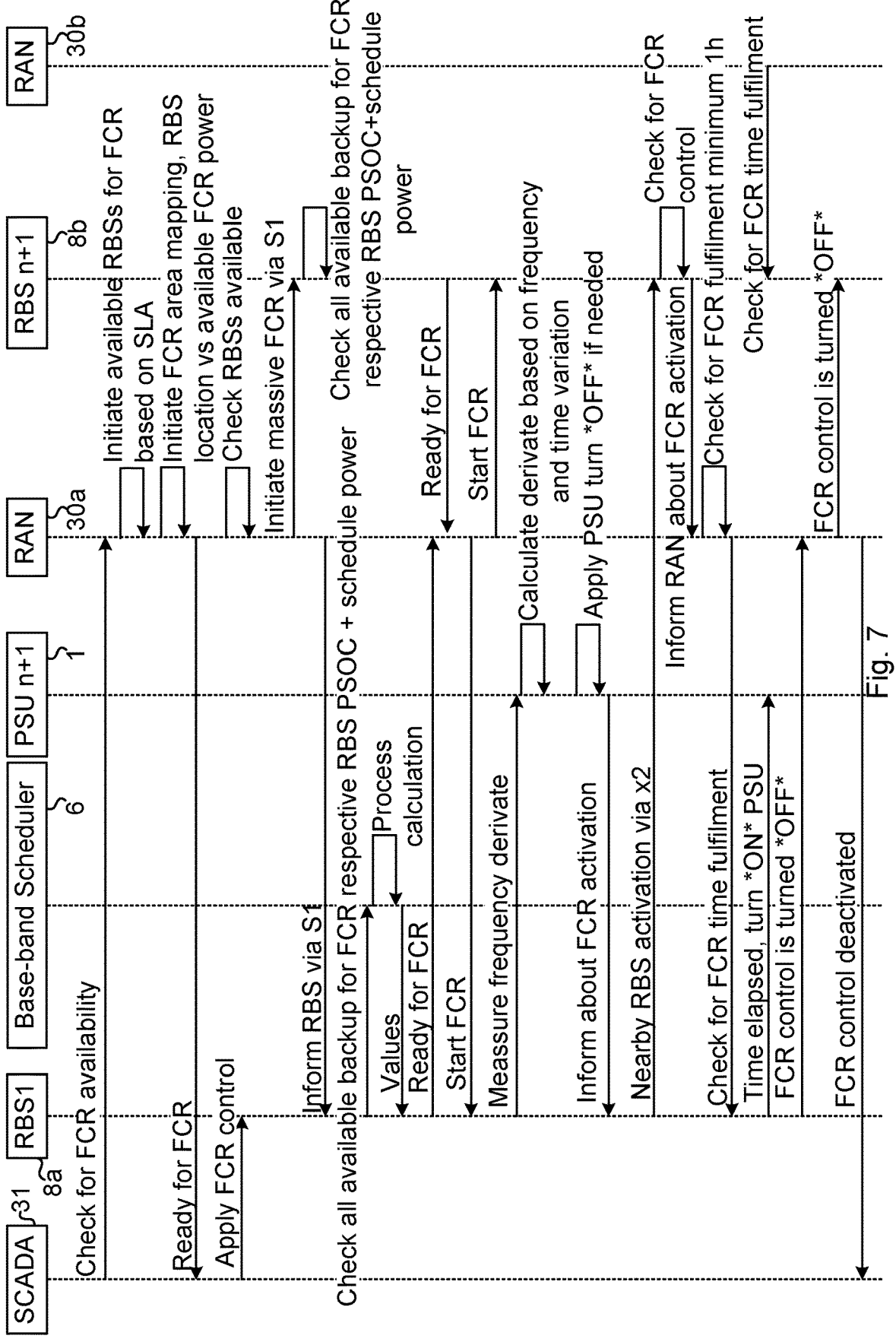
FIGS. 7 and 8 are signalling diagrams schematically illustrating frequency balancing according to embodiments presented herein.

FIG. 7 is an example of a signalling diagram between SCADA 31, RBSs 8, BB 6, PSU 1, and RANs 30.

SCADA 30 initially checks a RAN 30a for FCR availability. The RAN 30a initiate available RBSs 8a for FCR based on SLA. The RAN 30*a* thereafter initiates FCR area mapping, comparing RBS location vs available FCR power. The RAN 30*a* sends a ready for FCR message back to the SCADA 31, which in turn applies FCR control for RBS1 8*a*.

After the RAN 30*a* has sent the message back to the SCADA 31, the RAN 30*a* checks for further available RBSs 8*b*. Thereafter, based on signalling from SCADA 31, the RAN 30*a* initiates massive FCR for control via interface S1. Further RBSn+1 8*b* checks all available backup for FCR respective RBS PSOC and schedule power. The RAN 30*a* then informs RBS1 8*a* via S1 of available power and battery capacity.

RBS1 8*a* checks all available backup for FCR respectively RBS PSOC and schedule power at the BB scheduler 6. The BB scheduler 6 processes calculation and returns value numbers of MW (KW) available/needed to RBS1 8*a*.

RBS1 8*a* and RBSn+1 8*b* inform RAN 30*a* that they are ready for FCR. The RAN 30*a* returns instruction to start FCR to RBS1 8*a* and RBSn+1 8*b*.

RBS1 8*a* performs a first control of FCR by measuring frequency deviations in all its $PSU_{n+1}$. The PSUs 1 each calculates derivate based on frequency and time deviation. The PSUs 1 each deactivate them self by turning off if needed. The PSUs 1 inform the RBS1 8*a* of FCR activation.

The RBS1 8*a* sends information of FCR control for nearby RBSn+1 8*b* activation. The nearby RBSn+1 8*b* each check for FCR control, and then informs the RAN 30*a* of FCR activation. The RAN 30*a* checks for FCR fulfilment of minimum one hour, which is sent to RBS1 8*a*.

The nearby RBSn+1 8*b* receives a check for FCR time fulfilment from another RAN 30*b*. Information that is sent to neighbouring RBS is frequency deviation, the need to participate in the FCR, and FCR zone. By exchanging information with the neighbouring RBS, the latency of signalling is reduced. Similarly, in relation to deactivation of FCR control, information can be that the frequency is within limits.

The RBS1 8*a* activates its PSUs 1 and informs the RAN 30*a* that FCR control is deactivated. The RAN 30*a* deactivates FCR control for the nearby RBSn+1 8*b*, and informs SCADA 31 that the FCR control is deactivated.

Figure 8:
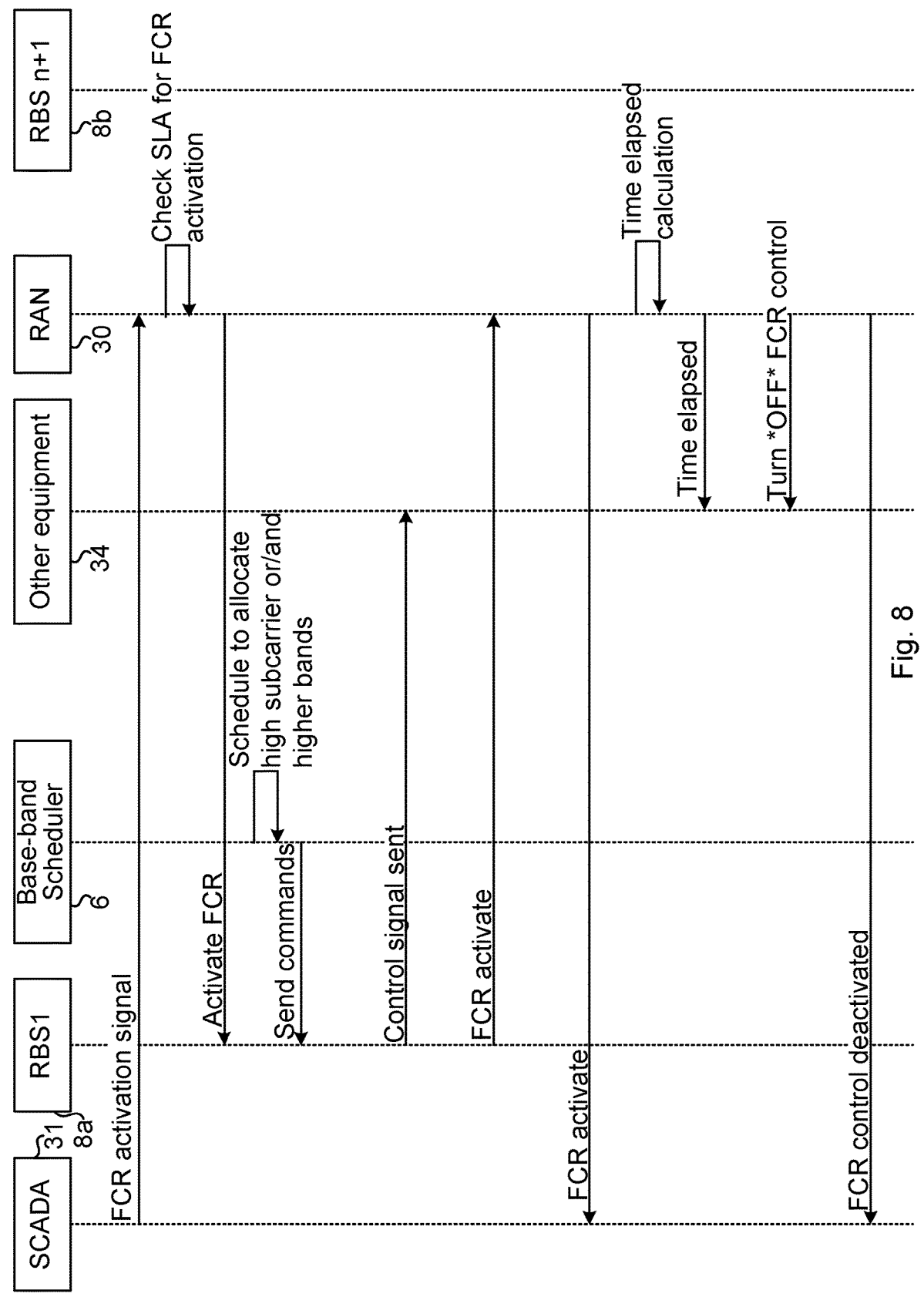

FIG. 8 is an example of a signalling diagram between SCADA 31, RBSs 8, BB 6, other equipment 34, and RAN 30.

SCADA 31 initially send an FCR activation signal to a RAN 30. The RAN 30 checks SLA for FCR activation, and send an activation of FCR to RBS1 8*a*.

The BB scheduler 6 allocates high subcarriers and/or higher bands for RBS1 8*a*, and send commands (activation or deactivation signals) to RBS1 8*a*. The BB scheduler 6 still control traffic data and may, for the FCR zone, need to rapidly reactivate RBS1 8*a* again.

RBS1 8*a* sends a control signal, related to frequency information and power information, to other equipment as preparation for later possible activation. Thereafter RBS1 8*a* sends information to RAN 30 that FCR is activated. RAN 30 in response thereto sends information to SCADA 31 that FCR is activated.

After activation RAN 30 calculates when the time for the FCR has elapsed and send information of elapsed time to the other equipment. Thereafter RAN 30 sends an instruction to the other equipment to turn off the FCR control, and also inform SCADA 31 thereof.

Figure 9A:
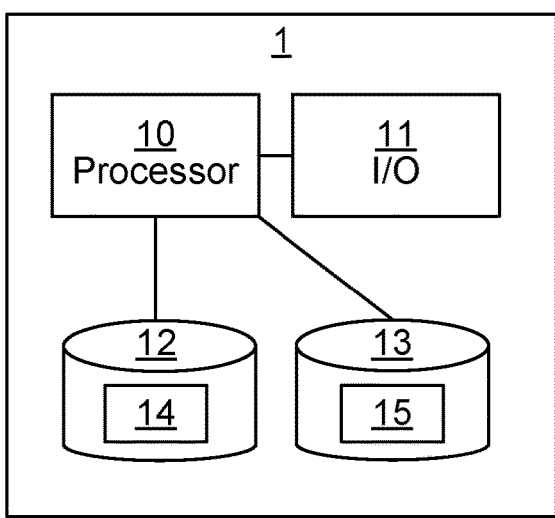
FIGS. 9A and 9B are diagrams schematically illustrating some components of devices presented herein.

According to an aspect, an embodiment of a PSU for frequency balancing in a power network grid is presented with reference to FIGS. 1 and 9A. The PSU 1 is connected to the power network grid. The PSU comprises a processing circuitry 10 and a computer program product 12, 13 storing instructions 14, 15 that, when executed by the processing circuitry, causes the PSU to detect a deviation of a power network grid frequency measured in the PSU 1, wherein the power network grid frequency is measured upstream of a PFC unit 2 of the PSU, deactivate the PSU in response to the detected deviation, to stop the PSU from drawing power from the power network grid, determine one or more further PSU to be deactivated based on the detected deviation, wherein the PSU is in a first FCR zone and the one or more further PSU are in a second FCR zone, other than the first FCR zone, and to send a deactivation indication to the determined one or more further PSU.

FIG. 9A is a schematic diagram showing some components of the PSU 1. The processing circuitry 10 may be provided using any combination of one or more of a suitable central processing unit, CPU, multiprocessing circuitry, microcontroller, digital signal processing circuitry, DSP, application specific integrated circuit etc., capable of executing software instructions of a computer program 14 stored in a memory. The memory can thus be considered to be or form part of the computer program product 12. The processing circuitry 10 may be configured to execute methods described herein with reference to FIG. 5A.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processing circuitry 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the PSU 1.

The PSU 1 may further comprise an input/output (I/O) interface 11 including e.g. a user interface. The PSU 1 may further comprise a receiver configured to receive signalling from other nodes, and a transmitter configured to transmit signalling to other nodes (not illustrated). Other components of the PSU 1 are omitted in order not to obscure the concepts presented herein.

Figure 9B:
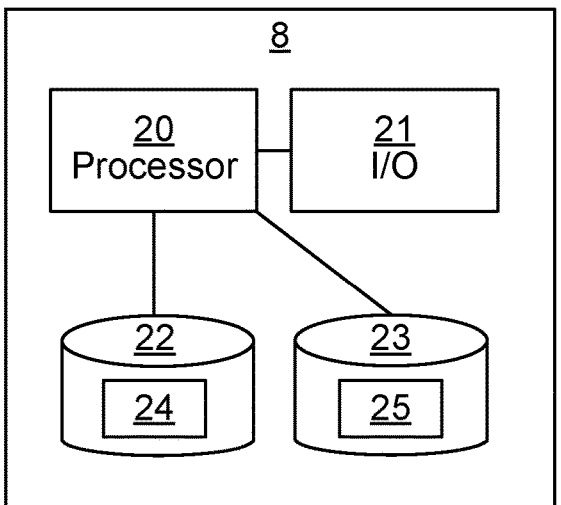

According to an aspect, an embodiment of an RBS for frequency balancing in a power network grid is presented with reference to FIGS. 1, 2 and 9B. The RBS 8 comprises one or more power supply units PSUs, connected to the power network grid. The one or more PSUs comprises a processing circuitry 20 and a computer program product 22, 23 storing instructions 24, 25 that, when executed by the processing circuitry, causes the one or more PSUs to detect a deviation of a power network grid frequency measured in a PSU 1 of the one or more PSUs, wherein the power network grid frequency is measured upstream of a PFC unit 2 of the PSU, deactivate the one or more PSU in response to the detected deviation, to stop the RBS from drawing power from the power network grid, determine one or more further PSU to be deactivated based on the detected deviation, wherein the RBS is in a first FCR zone and the one or more further PSU are in a second FCR zone, other than the first FCR zone, and to send a deactivation indication to the determined one or more further PSU.

FIG. 9B is a schematic diagram showing some components of the RBS 8. The processing circuitry 20 may be provided using any combination of one or more of a suitable central processing unit, CPU, multiprocessing circuitry, microcontroller, digital signal processing circuitry, DSP, application specific integrated circuit etc., capable of executing software instructions of a computer program 24 stored in a memory. The memory can thus be considered to be or form part of the computer program product 22. The processing circuitry 20 may be configured to execute methods described herein with reference to FIG. 5B.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 23 in the form of a data memory may also be provided, e.g. for reading and/or storing data during execution of software instructions in the processing circuitry 20. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 25, to improve functionality for the RBS 8.

The RBS 8 may further comprise an input/output (I/O) interface 21 including e.g. a user interface. The RBS 8 may further comprise a receiver configured to receive signalling from other nodes, and a transmitter configured to transmit signalling to other nodes (not illustrated). Other components of the RBS 8 are omitted in order not to obscure the concepts presented herein.

Figure 10A:
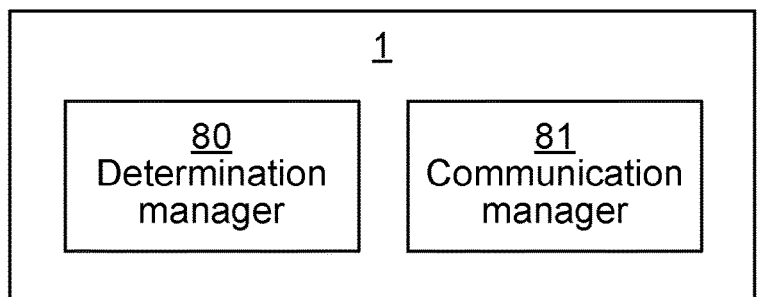
FIGS. 10A and 10B are diagrams schematically illustrating functional modules of devices presented herein.

According to an aspect, an embodiment of a PSU 1 for providing frequency balancing in a power network grid is presented with reference to FIG. 10A. The PSU 1 comprises a determination manager 80 for detecting a deviation of a power network grid frequency measured in the PSU 1, wherein the power network grid frequency is measured upstream of a PFC unit 2 of the PSU, deactivating the PSU in response to the detected deviation, to stop the PSU from drawing power from the power network grid, and for determining one or more further PSU to be deactivated based on the detected deviation, wherein the PSU is in a first FCR zone and the one or more further PSU are in a second FCR zone, other than the first FCR zone. The PSU 1 also comprises a communication manager 81 for sending a deactivation indication to the determined one or more further PSU.

FIG. 10 A is a schematic diagram showing functional blocks of the PSU 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the process blocks in the method illustrated in FIG. 5A, comprising a determination manager unit 80, and a communication manger unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manager 8o is for providing frequency balancing in a power network grid. This module corresponds to the processing blocks S100, S120, S130, S140, S160 and S170 of FIG. 5A. This module can e.g. be implemented by the processing circuitry 10 of FIG. 9A, when running the computer program.

The communication manager 91 is for providing frequency balancing in a power network grid. This module corresponds to the processing blocks S110 and S150 of FIG. 5A. This module can e.g. be implemented by the processing circuitry 10 of FIG. 9A, when running the computer program.

Figure 10B:
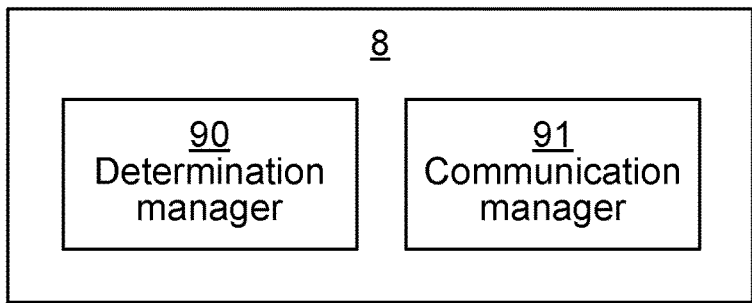

According to an aspect, an embodiment of an RBS 8 for providing frequency balancing in a power network grid is presented with reference to FIG. 10B. The RBS 8 comprises a determination manager 90 for detecting a deviation of a power network grid frequency measured in a PSU 1 of one or more PSUs, wherein the power network grid frequency is measured upstream of a PFC unit 2 of the PSU, deactivating the one or more PSU in response to the detected deviation, to stop the RBS from drawing power from the power network grid, and for determining one or more further PSU to be deactivated based on the detected deviation, wherein the RBS is in a first FCR zone and the one or more further PSU are in a second FCR zone, other than the first FCR zone. The RBS 8 also comprises a communication manager 91 for sending a deactivation indication to the determined one or more further PSU.

FIG. 10B is a schematic diagram showing functional blocks of the RBS 8. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the process blocks in the method illustrated in FIG. 5B, comprising a determination manager unit 90, and a communication manger unit 91. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manager 90 is for providing frequency balancing in a power network grid. This module corresponds to the processing blocks S200, S220, S230, S240, S260 and S270 of FIG. 5B. This module can e.g. be implemented by the processing circuitry 20 of FIG. 9B, when running the computer program.

The communication manager 91 is for providing frequency balancing in a power network grid. This module corresponds to the processing blocks S210 and S250 of FIG. 5B. This module can e.g. be implemented by the processing circuitry 20 of FIG. 9B, when running the computer program.

A computer program product comprising a computer program and a computer readable storage means on which the computer program is stored is also presented.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A method for providing frequency balancing in a power network grid using radio base stations (RBSs) in a radio access network (RAN), the RBSs connected to the power network grid and comprising one or more power supply units (PSUs), the method comprising:

detecting a deviation of a power network grid frequency measured in a power supply unit (PSU) of the one or more PSUs in a first RBS, the power network grid frequency being measured upstream of a power factor correction (PFC) unit of the PSU;

deactivating the one or more PSUs of the first RBS in response to the detected deviation, to stop the first RBS from drawing power from the power network grid;

determining one or more further PSUs of a second RBS to be deactivated based on the detected deviation, the first RBS being located in a first frequency containment reserve (FCR) zone and the one or more further PSUs of the second RBS being located in a second FCR zone, other than the first FCR zone; and sending a deactivation indication to the determined one or more further PSUs of the second RBS.

2. The method according to claim 1, further comprising: configuring each RBS in the one or more FCR areas of the RAN with a service layer agreement (SLA) from a supervisory control and data acquisition (SCADA) system to enable signalling between the SCADA system, the RAN and the RBSs in each FCR zone.

3. The method according to claim 1, further comprising: negotiating FCR control for the RBS with the SCADA system for the power network grid.

4. The method according to claim 1, wherein the one or more further PSUs are determined based on grid frequencies measured in the one or more further PSUs.

5. The method according to claim 1, further comprising: detecting a return to a normal grid frequency of the power network grid frequency measured in the PSU, wherein the power network grid frequency is measured upstream of a PFC unit of the PSU; and determining which of the deactivated PSUs to activate based on grid frequencies measured in the deactivated PSUs.

6. The method according to claim 5, wherein the determination to activate comprises a condition whether to charge a backup battery or not.

7. The method according to claim 1, wherein the deactivation indication is sent from the first FCR zone to the second FCR zone via an X2 interface.

8. The method according to claim 1, wherein the deactivation is performed within 200 ms of the detection when the frequency deviation is measured to be at least 0.06 Hz/s.

9. The method according to claim 1, wherein the RBS is powered by a three-phase power via one or more PSU per phase.

10. The method according to claim 1, wherein the RBS comprises a battery backup configured to supply the RBS with power when the one or more PSUs are deactivated.

11. The method according to claim 1, further comprising predicting future FCR activations for at least one of RBSs and datacentre infrastructure by machine learning, and initiating chain control for FCR zoning and FCR activations via an S1 and an X2 interface.

12. A method for providing frequency balancing in a power network grid using radio base stations (RBSs) in a radio access network (RAN), the radio base station (RBS)

comprising one or more power supply units (PSUs) connected to the power network grid, the method comprising:

detecting a deviation of a power network grid frequency measured in a power supply unit (PSU) of an RBS, the power network grid frequency being measured upstream of a power factor correction (PFC) unit of the PSU;

deactivating the PSU of the RBS in response to the detected deviation, to stop the PSU from drawing power from the power network grid;

determining one or more further PSUs of another RBS to be deactivated based on the detected deviation, the PSU of the RBS being located in a first frequency containment reserve (FCR) zone and the one or more further PSUs located in a second FCR zone, other than the first FCR zone; and sending a deactivation indication to the determined one or more further PSUs of the another RBS.

13. The method according to claim 12, further comprising:

configuring the one or more PSUs of the RBSs with a service layer agreement (SLA) from a supervisory control and data acquisition (SCADA) system to enable signalling between the SCADA system, the RAN and the RBSs in the FCR zones.

14. The method according to claim 12, further comprising:

negotiating FCR control for the PSU with the SCADA system for the power network grid.

15. The method according to claim 12, wherein the one or more further PSUs are determined based on grid frequencies measured in the one or more further PSUs.

16. The method according to claim 12, further comprising:

detecting a return to a normal grid frequency of the power network grid frequency measured in the PSU, wherein the power network grid frequency is measured upstream of a PFC unit of the PSU;

determining which of the deactivated PSUs to activate based on grid frequencies measured in the deactivated PSUs.

17. The method according to claim 12, wherein the deactivation is performed within 200 ms of the detection when the frequency deviation is measured to be at least 0.06 Hz/s.

18. The method according to claim 12, further comprising predicting future FCR activations for at least one of RBSs and datacentre infrastructure by machine learning, and initiating chain control for FCR zoning and FCR activations via an S1 and an X2 interface.

19. A radio base station (RBS) in a radio access network (RAN) for use in frequency balancing in a power network grid, the RBS comprising one or more power supply units (PSUs) connected to the power network grid, the one or more PSUs comprising:

a processing circuitry; and a computer program product storing instructions that, when executed by the processing circuitry, causes the one or more PSUs to:

detect a deviation of a power network grid frequency measured in a PSU of the one or more PSUs of the RBS, the power network grid frequency being measured upstream of a power factor correction (PFC) unit of the PSU;

deactivate the one or more PSUs of the RBS in response to the detected deviation, to stop the RBS from drawing power from the power network grid;

determine one or more further PSUs of another RBS to be deactivated based on the detected deviation, the RBS being located in a first frequency containment reserve (FCR) zone and the one or more further PSUs of another RBS being located in a second FCR zone, other than the first FCR zone; and send a deactivation indication to the determined one or more further PSUs of the another RBS in the second FCR zone.

20. A power supply unit (PSU) of a radio base station (RBS) for use in frequency balancing in a power network grid of a radio access network (RAN), the PSU being connected to the power network grid, the PSU comprising:

a processing circuitry; and a computer program product storing instructions that, when executed by the processing circuitry, causes the PSU to:

detect a deviation of a power network grid frequency measured in the PSU, the power network grid frequency being measured upstream of a power factor correction (PFC) unit of the PSU;

deactivate the PSU in response to the detected deviation, to stop the PSU from drawing power from the power network grid;

determine one or more further power supply units (PSUs) of another RBS to be deactivated based on the detected deviation, the PSU of the RBS being located in a first frequency containment reserve (FCR) zone and the one or more further PSUs of the another RBS being located in a second FCR zone, other than the first FCR zone; and send a deactivation indication to the determined one or more further PSUs of the another RBS located in the second FCR zone.

* * * * *